United States Patent [19]

Oshima et al.

[11] 3,978,178
[45] Aug. 31, 1976

[54] PROCESS FOR PRODUCING ABRASION-RESISTANT CAST ARTICLE

[75] Inventors: Akira Oshima; Kazunori Abe; Nobuo Kameda, all of Otake, Japan

[73] Assignee: Mitsubishi Rayon Co., Ltd., Tokyo, Japan

[22] Filed: May 9, 1974

[21] Appl. No.: 468,577

[30] Foreign Application Priority Data
Apr. 30, 1974 Japan.................. 49-48550

[52] U.S. Cl.................. 264/25; 264/166; 264/236; 264/255; 264/331; 264/338; 264/347
[51] Int. Cl.² .................. B29D 7/02; B29D 9/00
[58] Field of Search.......... 264/236, 347, 171, 255, 264/316, 166, DIG. 59, 331, 297, 25, 338

[56] References Cited
UNITED STATES PATENTS

| | | | |
|---|---|---|---|
| 2,997,745 | 8/1961 | Kroeker | 264/255 |
| 3,320,344 | 5/1967 | Slipp | 264/246 |
| 3,518,341 | 6/1970 | Haryu | 264/255 |
| 3,539,388 | 11/1970 | Tu | 264/331 |

*Primary Examiner*—Jeffery R. Thurlow
*Attorney, Agent, or Firm*—Armstrong, Nikaido & Wegner

[57] ABSTRACT

An improvement in a process for producing a synthetic resin cast article having an abrasion-resistant polymer surface layer integrated with the polymer body is provided. The improvement is characterized in that the abrasion-resistant polymer surface layer is formed by a two step polymerization procedure; in the first polymerization step, the polymerizable material is covered with a covering body such as a polymer film, closely adhered thereto, and in the second polymerization step, the polymerizable material is exposed to the air.

18 Claims, 4 Drawing Figures

PROCESS FOR PRODUCING ABRASION-RESISTANT CAST ARTICLE

The present invention relates to a process for producing a synthetic resin cast article having improved resistance to surface abrasion.

Several processes have been heretofore proposed in order to impart abrasion resistance to the surface of a synthetic resin cast article. For example, U.S. Pat. No. 2,997,745 discloses a method wherein a dimethacrylate of diethylene or triethylene glycol or of an alkane diol with 3 to 6 carbon atoms, i.e. a compound capable of forming cross-links and having two methacryloyloxy groups in the molecule, is deposited in the form of a film onto the inner surface of a mold and thereafter, a lower alkyl ester of methacrylic acid is charged into the mold, followed by the simultaneous polymerization of the dimethacrylate (in the form of a film) and the lower alkyl ester of methacrylic acid, thereby forming a cast article of the polymerized methacrylate having a surface of cross-linked dimethacrylate polymer with improved abrasion resistance. U.S. Pat. No. 3,518,341 discloses a method wherein, firstly, a compound capable of forming cross-links and having two acryloxy or methacryloxy groups in the molecule is coated on the inner surface of a mold and then, is completely polymerized while the coated layer is covered with a film of a high polymer having no affinity therewith, closely adhered thereto, and thereafter, a monomeric material to be formed into the polymer body is charged into the mold, followed by the polymerization of the monomeric material. The latter method is advantageous, as compared with the former method, from the standpoint that the compound having two acryloxy or methacryloxy groups in the molecule is formed into a film of uniform thickness covering the entire inner surface of the mold and consequently, a cast article superior in abrasion resistance and optical properties is obtainable.

In general, a film of improved abrasion resistance, which is prepared by polymerizing a monomeric material capable of forming cross-links and having at least two acryloxy or methacryloxy groups in the molecule, on the inner surface of a mold, should possess the following characteristics:

i. surface smoothness and uniformity in thickness,
ii. degree of hardening to such an extent that the film is not capable of being dissolved in or swollen with the monomeric material to be formed into the polymer body in contact with the film, and
iii. capacity to adhere to or be separated from the inner surface of the mold such that the film adheres sufficiently to the inner surface of the mold during polymerization of the monomeric material for the polymer body in contact with the film, but separates easily from the inner surface of the mold after polymerization of the monomeric material for the polymer body is completed.

It is already known that an abrasion-resistant polymer surface layer possessing the above characteristics is obtainable when the particular material to be formed into the film is suitably selected and polymerization of the material is carried out while the material coated on the surface of a mold is covered with a covering body such as a polymer film, closely adhering to the coated material. However, there are some problems from the standpoint of practical, commercial production, particularly continuous production. That is, both the adhesion between the surface of the mold and the abrasion-resistant polymer layer formed from the coated material and the adhesion between said polymer layer and the covering body should be to such a small extent that the covering body is capable of being easily separated from the polymer layer and said polymer layer is capable of being easily separated from the mold; and the adhesion between the mold surface and the abrasion-resistant polymer layer formed from the coated material should be stronger than that between the polymer layer and the covering body. However, these requirements are not always satisfied, i.e., when the covering body is separated from the polymer layer formed from the coated material after the coated material hardens, the hardened polymer layer is sometimes undesirably separated from the mold surface even if the covering body is suitably selected from those having no affinity with the coated material. This is the first problem and results because firstly, the adhesion force between the polymer layer formed from the coated material and the covering body generally increases with an increase in the degree of hardening of the coated material and secondly, both the adhesion forces, set forth above, vary greatly depending upon the manner by which and the temperature at which the covering body is separated from the hardened film, and also upon stains present on the mold surface and the degree of desiccation of the mold surface.

The second problem is that, in the case where the hardening of the abrasion-resistant polymer layer-forming coated material is carried out in a continuous manner and a polymer film is employed as a covering body, both means for tentering the polymer film and for transporting the mold coated with the polymer layer-forming material which is covered with the polymer film need to be extended, because the time period, during which the coated polymer layer-forming material hardens, is lengthy.

It has now been found that, when the polymerization, i.e. the hardening of the abrasion-resistant polymer layer-forming is carried out to a stated extent while the polymer layer-forming material coated on the mold surface is covered with a covering body closely adhering thereto, and is then continued in the absence of the covering body, until hardening is completed, the above-mentioned problems can be obviated.

Therefore, it is an object of the present invention to provide a synthetic resin cast article having an abrasion-resistant polymer surface layer integrated with the polymer body, the surface layer being characterized by a smooth surface and uniform thickness.

It is another object of the present invention to provide an advantageous process for producing the above-mentioned synthetic resin cast article of improved abrasion resistance wherein a covering body is capable of being easily separated from the hardened abrasion-resistant polymer without the undesirable separation of the hardened abrasion-resistant polymer layer from the mold surface.

Still another object of the present invention is to provide a continuous process employing simplified equipment to produce the above-mentioned synthetic resin cast article of improved abrasion-resistance.

In accordance with the present invention, there is provided an improvement in a process for producing a synthetic resin cast article having an abrasion-resistant polymer surface layer integrated with the polymer body which includes the steps of:

a. spreading onto all or part of the inner surface of a mold member a liquid polymerizable material selected from (i) a compound having a total of at least two acryloxy ($CH_2=CH.CO.O-$) and/or methacryloxy ($CH_2=C(CH_3).CO.O-$) groups in the molecule, and having a molecular weight of at least 150, (ii) a mixture comprising at least 30% by weight of said compound and at most 70% by weight of at least one other copolymerizable monoethylenically unsaturated compound, and (iii) a partially polymerized product of said compound or said mixture,
b. polymerizing the polymerizable material to an extent such that the polymerized material is not swollen with or dissolved in a monomer to be formed into the polymer body, thereby forming an abrasion-resistant polymer layer on the inner surface of the mold member,
c. charging a mixture of the monomer for the polymer body and a polymerization initiator into the mold and then, polymerizing the monomer, and
d. after completion of polymerization, releasing the cast article from the mold;

said improvement comprises carrying out the polymerization of said polymerizable material in two steps; in the first step, said polymerizable material is polymerized while said polymerizable material is covered with a closely adhering covering body having little or no affinity therewith until the gel content reaches 40% to 95%, and in the succeeding second step, polymerization is continued in the absence of the covering body until the gel content increases by 0.5% to 60% and reaches at least 90%.

In the first step, polymerization is carried out until the gel content in the polymerized material reaches 40 to 95%, preferably 60 to 90%. The term "gel content" used herein refers to the content in percentage by weight of the polymerized material which remains insoluble when extracted by acetone at 50°C, and it is determined by immersing the polymerized material in film form in acetone at 50°C for 1 hour and then, drying the film at 50°C in vacuo. Suitability of gel content varies, depending upon the particular polymerizable or polymerized material. When the gel content reaches a preferred value, a covering body such as a polymer film closely adhered to the polymerized material can be easily separated from the polymerized material without the undesirable separation of the polymerized material from the mold surface.

In the second step, polymerization is carried out until the polymerized material is no longer capable of being swollen with or dissolved in a monomer for the polymer body. The gel content, when this second step is completed, is usually at least 90%, preferably at least 95%. The suitable gel content varies depending upon the particular polymerizable material, the particular polymerization initiator and the amount thereof, and the thickness of the polymerized material.

If the gel content, when the first polymerization step is completed, is large, an increase in the gel content in the second polymerization step may be minimal. By contrast, if the gel content upon completion of the first polymerization step is small, the increase in the gel content in the second step should be large so that the final gel content is at least 90%. In general, an increase of the gel content in the second polymerization step is within the range from 0.5 to 60%, preferably from 1.0 to 40%.

If the gel content is below approximately 40% at the time when the first polymerization step is completed, it is difficult to raise the gel content to a desired level in the second polymerization step. By contrast, if the gel content is above approximately 95% on completion of the first polymerization step, the polymerized material tends to be undesirably separated from the mold surface when the covering body is separated from the polymerized material.

Each mold member has one surface on which an abrasion-resistant layer of the polymerized material has been formed and these members are assembled into a mold. The mold is filled with a mixture comprising a monomer for the polymer body and a polymerization initiator, and is then closed, followed by effecting the polymerization. After completion of the polymerization, the mold members are removed from the cast article. The abrasion-resistant polymer layer previously formed on one surface of the mold members is completely transferred therefrom to the cast article when the cast article is removed from the mold. Thus, a synthetic polymer cast article having an abrasion-resistant polymer surface layer integrated with the polymer body is obtainable.

The adhesion between the abrasion-resistant polymer surface layer and the polymer body, of the cast article of the present invention is much stronger as compared with the adhesion of a known cast article prepared by a method wherein the abrasion-resistant polymer surface layer is formed by polymerizing the monomeric material while the monomeric material is covered with a covering body closely adhered thereto, throughout the entire course of polymerization. The reason for the above is presumed to be that, although the abrasion-resistant surface layer formed by the two step polymerization procedure of the present invention is hard enough not to be swollen with or dissolved in a monomer for the polymer body, the part close to the surface of the abrasion-resistant polymer layer is not sufficiently polymerized, i.e., it is in the state of still possessing high affinity with the monomer for the polymer body.

The thickness of the polymerized material is within the range from 0.001 to 0.5 mm, preferably from 0.003 to 0.1 mm, and more preferably from 0.005 to 0.05 mm. If it is too thin, the resulting cast article having such an abrasion-resistant polymer surface layer tends to become scratched when subjected to a severe abrasive force. Further, it is difficult to prepare a uniform layer of the polymerized material. By contrast, when the thickness is in excess of the upper limit, the abrasion-resistant layer forming polymerizable material suddenly decreases in volume during the polymerization thereof, and this results in a product having cracks on the surface and being optically distorted.

The manner whereby the polymerizable material is polymerized is not critical. In general, polymerization is performed by heating the monomeric mixture containing a heat-decomposable polymerization initiator, or by applying ultraviolet rays to the monomeric mixture containing a photosensitizer or γ-rays or other ionizing radiation. The conditions under which polymerization is carried out vary depending upon the particular polymerizable compound, and the particular polymerization initiator and the amount thereof. The time period for polymerization is approximately the same as that in the case where the polymerization is carried out in one step.

Preferred methods for polymerization are:
1. to effect polymerization by irradiation with ultraviolet rays while the polymerizable material is covered with an organic high polymer film in the first polymerization step and in the absence of the polymer film in the second polymerization step, and
2. to effect the first polymerization by heating the monomeric mixture while the monomeric mixture is covered with an organic high polymer film or a metal film and effecting the second polymerization by irradiation with ultraviolet rays in the absence of the polymer or metal film.

The covering body should be made of a material having little or no affinity with the abrasion-resistant surface layer forming polymerizable material. Such a material may be selected from organic high polymers, metals and inorganic materials such as glass. The covering body should have a smooth surface and generally, is in the form of film or plate. The thickness of the film or plate depends upon permeability to oxygen, rigidity and the polymerization conditions. A suitable material for the covering body should be selected particularly depending upon the polymerization procedure employed. For example, material capable of transmitting ultraviolet rays is suitable for the polymerization procedure wherein ultraviolet rays irradiate, and thermal resistant material is suitable for the polymerization procedure wherein heat is applied.

The covering body may be a cylinder or roller of a large diameter provided that the polymerization of the surface layer forming polymerizable material is carried out in a continuous manner and completed within a short period of time.

Most preferable are organic high polymer films. The organic high polymer films include those of, for example, polyvinyl alcohol and its acetalized product, cellophane or regenerated cellulose, moisture-proofing cellophane or moisture-proof cellulose, polyethylene, polypropylene, polyvinyl chloride, polyvinylidene chloride, polytetrafluoroethylene, polyamide and polyester film. Of these, polypropylene film has a tendency to adhere strongly to an abrasion-resistant polymer layer when the polymer layer is sufficiently hardened by the ultraviolet ray irradiation polymerization and therefore, is suitable for the two stage polymerization of the present invention.

The polymerization procedure, wherein the polymerizable material is polymerized while being covered with a covering body such as an organic high polymer film, has the following advantages. First, polymerization takes place at an enhanced rate similar to that in the case where polymerization is effected in an inert gas atmosphere. Secondly, the covering body prevents the polymerizable material spread onto the mold surface from agglomerating in blobs, either immediately after coating or during polymerization. Because of these two advantages, this polymerization procedure is particularly suitable for the manufacture of large size cast articles. Thirdly, no extension-promoting agent is required to be added and hence, there are no disadvantages derived from the addition of same. Fourthly, even in the case where the polymerizable material contains a volatile compound, there is no problem caused by evaporation of the compound.

Mold members, on which the polymerizable material is spread and polymerized, are usually plates made of, for example, inorganic glass, stainless steel, nickel-chromium-plated metal and aluminum.

The liquid polymerizable material to be formed into an abrasion-resistant surface layer by the two step polymerization procedure of the present invention is a compound having a total of at least two arcyloxy and/or methacryloxy groups in the molecule, said groups being preferably linked with an aliphatic hydrocarbon residue or its derivative such as aliphatic hydrocarbon groups linked with at least one ether linkage, and having a molecular weight of at least 150.

The polymerizable material may be a mixture composed of such a compound and other copolymerizable monomers. The mixture should contain the compound defined above in an amont of at least 30% by weight, because if the amount is less than approximately 30% by weight, it is difficult to obtain an abrasion-resistant surface layer hard enough not to be swollen with or dissolved in a monomer for the polymer body, and this often results in a cast article having linear cracks on the surface and only mediocre abrasion resistance. Also, the polymerizable compound may be a partially polymerized product of the compound defined above.

The compounds are preferably those which are prepared from polyhydric alcohol and acrylic or methacrylic acid or its functional derivative, or those which possess a linear structure and are prepared from polyhydric alcohol, polycarboxylic acid and acrylic or methacrylic acid or its functional derivative.

Preferable polyhydric alcohols used in the preparation of the above compounds include, for example, ethylene glycol, diethylene glycol, triethylene glycol, tetraethylene glycol, polyethylene glycol having an average molecular weight of approximately 300 to 1,000, propylene glycol, dipropylene glycol, 1,3-propanediol, 1,3-butanediol, 2,3-butanediol, 1,4-butanediol, 1,5-pentanediol, 1,6-hexanediol, neopentyl glycol(2,2-dimethyl-1,3-propane-diol), 2-ethyl-1,3-hexanediol, 2,2'-thiodiethanol, 1,4-cyclohexanedimethanol, 1,1,1-trimethylolpropane, pentaglycerol(1,1,1-trimethylolethane), glycerol, 1,2,4-butanetriol, 1,2,6-hexanetriol, pentaerythritol(2,2-bishydroxymethyl-1,3-propanediol), diglycerol and dipentaerythritol.

Preferable compounds, which are prepared from polyhydric alcohols given above and acrylic or methacrylic acid or its derivative, are those having an aliphatic hydrocarbon residue of not greater than 20 carbon atoms. These include, for example, diethylene glycol diacrylate, diethylene glycol dimethacrylate, triethylene glycol diacrylate, triethylene glycol dimethacrylate, tetraethylene glycol diacrylate, tetraethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and pentaglycerol triacrylate.

The compounds which are prepared from polyhydric alcohol, polycarboxylic acid and acrylic or methacrylic acid possess equimolar amounts of the hydroxyl groups from the polyhydric alcohol and the carboxyl groups from the polycarboxylic acid and the acrylic or methacrylic acid. Of these, preferable compounds are prepared by reacting a glycol of the formula $HO-R_2-OH$ or its derivative (I), a dicarboxylic acid of the formula $HOOC-R_3-COOH$ or its chloride, anhydride or ester (II) and acrylic or methacrylic acid or its chloride or ester (III) at the molar ratio of $(I) : (II) : (III) = n + 1 : n : 2 \sim 2.2$, and represented by the formula

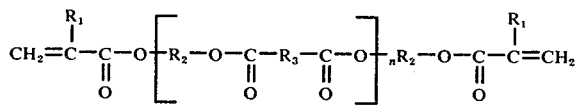

wherein $R_1$ is hydrogen or a methyl group, $R_2$ is a residue of an aliphatic hydrocarbon having 2 to 20 carbon atoms or its derivative, $R_3$ is a residue of a saturated aliphatic hydrocarbon or an aromatic hydrocarbon, each having 2 to 20 carbon atoms or its derivative, and $n$ is an integer of from 1 to 5. Preferable glycols of the formula (I) include dihydric alcohols of the polyhydric alcohols listed hereinbefore. Preferable compounds of formula (II) include, for example, aliphatic dicarboxylic acids such as succinic acid, adipic acid and sebacic acid; alicyclic dicarboxylic acids such as tetrahydrophthalic acid and 3,6-endomethylenetetrahydrophthalic acid; aromatic dicarboxylic acids such as phthalic acid, isophthalic acid and terephthalic acid; and their chlorides, anhydrides and esters.

In general, when the distance between the acryloxy or methacryloxy groups is too short, the resulting abrasion-resistant polymer layer is brittle and tends to be separated from the mold surface prior to the casting, and the resulting cast article tends to be cracked on the surface. By contrast, when the distance between the acryloxy or methacryloxy groups is too long, the resulting abrasion-resistant layer possesses good extendibility but is poor in abrasion resistance and solvent resistance. Therefore, the polymerizable material should be suitably selected such that the distance or average distance between the acryloxy or methacryloxy groups is moderate, depending upon the polymerization condition, the intended size of the cast article, the desired balance between abrasion resistance and processability and the polymer body.

An acryloxy group containing-compound is usually more preferable than a methacryloxy group containing-compound. This is because the latter compound is lower in polymerization and conversion rates and its polymer is somewhat more brittle. Further, the surface layer prepared from the latter compound is liable to possess cracks, although to a minor extent, and is poorer in weather resistance.

Copolymerizable monomers, which may be employed in addition to the acryloxy or methacryloxy compound, are monoethylenically unsaturated compounds such as, for example, acrylic acid or its ester, methacrylic acid or its ester, acrylonitrile, methacrylonitrile and styrene. These copolymerizable monomers ae employed for the purpose of reducing viscosity of the polymerizable material when the polymerizable material is highly viscous, dissolving the polymerizable material when the material is solid or imparting desirable physical properties to the polymer layer prepared therefrom.

The polymerizable material may be polymerized, for example, by heating the reaction mixture containing a heat-decomposable polymerization initiator or by applying ultra-violet rays to the reaction mixture containing a photosensitizer, or applying γ-rays or other ionizing radiation. A heat-decomposable polymerization initiator includes known radical polymerization initiators such as oil-soluble peroxides and azo compounds. A photosensitizer is preferably capable of activating the polymerizable material at a predominant wave length from 3,000 to 4,000 A to produce the radical, and generally includes, for example, carbonyl compounds. Preferable initiators exhibit enhanced activity for radical polymerization and include, for example, azobisisobutyronitrile, benzoyl peroxide, lauroyl peroxide, and benzoin and its alkyl ether, the alkyl group having at most 4 carbon atoms. These initiators may be used alone or in combination. The amount of initiator is not greater than 5%, preferably not greater than 3% and more preferably not greater than 2%, all by weight based on the weight of the polymerizable material. In the case where an initiator possessing very low activity for the radical polymerization is employed, the resulting polymer layer is poor in abrasion resistance due to the plasticizing function of the remaining unexpended initiator or the initiator residue, or because it is difficult to obtain the desired degree of polymerization. As a source of irradiation with ultraviolet rays, a fluorescent chemical lamp, mercury lamp, arc lamp and xenon lamp may be used.

The monomer used for the preparation of the polymer body of the cast article includes, for example, lower alkyl esters of methacrylic acid such as methyl methacrylate; styrene, acrylonitrile and methacrylonitrile. These monomers may be used alone or as a mixture with each other or with another copolymerizable and castable monomer, or as a partially polymerized product thereof. Such comonomers include, for example, acrylic acid and methacrylic acid. The cast article of the present invention may also be made from unsaturated polyester resins, such as those prepared by the condensation, for example, between phthalic acid or maleic acid and ethylene glycol or propylene glycol. Most preferable are methyl methacrylate, a monomeric mixture containing methyl methacrylate in an amount of at least 50% by weight, and a partially polymerized product thereof.

As a polymerization initiator for the monomer, known free radical initiators such as oil-soluble peroxides and azo compounds may generally be used. For example, azobisisobutyronitrile, azobisdimethylvaleronitrile, azobiscyclohexanenitrile, benzoyl peroxide, lauroyl peroxide, 2,4-dichlorobenzoyl peroxide, isopropylperoxydicarbonate, isobutyl peroxide and acetylcyclohexylfonyl peroxide are included. Redox catalysts such as a combination of peroxide and amine may also be employed.

If desired, additives such as a stabilizer, flame retardant, plasticizer, molecular weight controlling agent, filler, dye and pigment may be incorporated into the monomer.

Both the two step polymerization for the preparation of the abrasion-resistant polymer surface layer and the casting for the preparation of the polymer body may be carried out in a batchwise manner or in a continuous manner. It is also possible to carry out one of either preparation of the surface layer or the polymer body in a continuous manner, and the other in a batchwise manner.

Preferable processes for the preparation of the cast article will be further illustrated with reference to the accompanying drawings. In the drawings:

FIG. 1 schematically shows a process for continuously forming the abrasion-resistant polymer surface layer on a plurality of mold members;

FIG. 2 schematically shows a process for continuously preparing the cast article by using a pair of endless belts as a mold;

Figure 1:
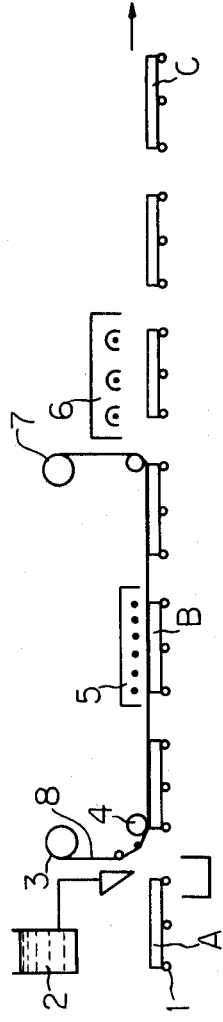

In FIG. 1, a plurality of mold members A such as those made of tempered plate glass are continuously moved in a row at stated intervals while being supported by a conveyor means 1 such as rollers or a belt. A polymerizable material is fed from a reservoir 2 through a metering pump and uniformly spread onto the mold member A by a suitable means such as a roller coater, a flow coater or a spray. An organic polymer film 8, continuously withdrawn from a roll 3 at the same speed as that of the mold member, is closely adhered to the spread surface by press roller 4 having a surface layer of sponge-like soft rubber. At the same time, the thickness of the spread material is made uniform and air bubbles are forced out from the material by the press roller 4. In order to force out the air bubbles completely and to prevent the mold member from remaining partially uncoated, it is preferable to first oversupply the material onto the mold member A and then press out the surplus material by the press roller. The thickness and the uniformity in thickness may be controlled by varying the viscosity of the polymerizable material, the travelling speed of the mold member and the pressure of the press roller 4. The mold member B having the polymerizable material spread thereon is then moved through a first polymerization zone 5 where the polymerizable material sandwiched between the mold member B and the film 8 is polymerized. After the polymerization is completed, the polymer film 8 is continuously peeled off by a take-up roller 7 from the polymerized material closely adhering to the mold member, and the polymerized material is further polymerized in a second polymerization zone 6 to such an extent that the polymerized material is not swollen with or dissolved in a monomer for the polymer body.

The polymerization zones 5 and 6 may be ventilated to control the temperature and to discharge harmful gas. In a zone ranging from the point at which a polymer film 8 is made to adhere closely to the mold member to the point at which the film is peeled off from the polymerized material, the polymerized material and the mold member are fixed to each other, the film tends to become creased and, on rare occasions, air penetrates from the circumference of the mold member due to a slight disturbance in alignment between the film and the mold members arranged in a row at stated intervals, and this results in a cast plate having a rugged surface and therefore reduced optical, mechanical and thermal properties. Therefore, it is preferred in the above zone to stretch the film in the lateral direction by grasping it at both edges by a tensioning device and in the longitudinal direction by applying a slight brake force to the feed roller and to adjust the balance between the tensions in both directions. In the example shown in FIG. 1, the film 8 is fed from a roll 3 and taken-up by a roller 7. However, an endless film may be used in substitution therefor, in a manner similar to that shown in FIG. 2. A device for removing stains and creases from the film may be attached to the continuous production apparatus.

All the mold members should have the same width, but need not have the same length. It is possible to decrease the distance between the adjacent mold members. The conveyor means 1 may be driven in a continuous manner as illustrated above or in an intermittent manner. In the latter case, the conditions under which the first polymerization is carried out may be varied in synchronization with the conveyor movement.

The two mold members C each having an abrasion-resistant polymer layer closely adhered to one surface thereof are assembled into a mold in a manner such that the two polymer layers are face to face with each other, and sealed with a gasket at the circumference, in a known manner. A mixture of a monomer for the polymer body and a polymerization initiator is charged into the mold to be polymerized. After the completion of polymerization, the mold is released to obtain a synthetic resin cast plate having two thin synthetic polymer surface layers of improved abrasion resistance separated from the mold surface and integrated with the polymer body. One of the two mold members may be substituted with a mold member having no polymer layer. This results in a case plate having an abrasion-resistant polymer surface layer on only one surface thereof.

Figure 2:
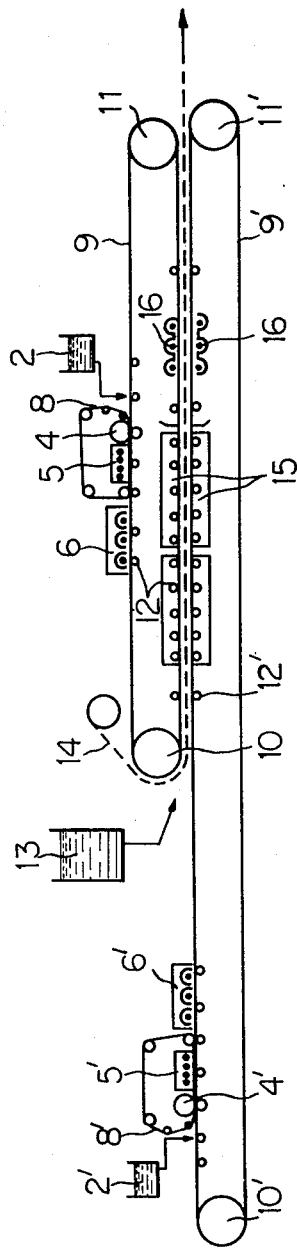

In FIG. 2, a pair of endless belts 9, 9' continuously moving at the same speed while being stretched by pulleys 10, 11 and 10', 11', are kept horizontal by a plurality of idle rollers 12, 12'. Two polymerizable materials for surface layers are separately fed from reservoirs 2, 2' through metering pumps (not shown in FIG. 2) to each upper surface of the belts 9, 9', respectively. Two endless polymer films 8, 8' continuously moving at the same speed as those of the belts 9, 9' are separately closely adhered to the spread surfaces by press rollers 4, 4' each having a surface layer of sponge-like soft rubber, respectively. By the press rollers 4, 4', the thickness of the spread material is made uniform and air bubbles are forced out from the spread material. The films closely adhered to the spread surface are uniformly stretched in the longitudinal direction by applying a slight braking force to the feed rollers and in the lateral direction by a tenter. The spread materials are polymerized while passing through first polymerization zones 5, 5'. Then, the films are peeled off from the polymerized materials each closely adhering to the belt surface. After the separation of the films, the polymerized materials are further polymerized while passing through second polymerization zones 6, 6'.

The step of polymerizing the monomeric material for the polymer body is carried out in the following manner. The pair of endless belts 9, 9' continuously moving at the same speed as each other, each one surface of the pair of belts on which an abrasion-resistant polymer layer has been formed facing the other and continuously moving in the same direction, and two gaskets 14 continuously fed to the side edge portions of the endless belts form a casting space wherein the monomer is polymerized. Through an opening at one end of the casting space, a liquid monomeric material 13 for the polymer body is continuously fed into the casting space. After the monomer is continuously polymerized in the casting space with the distance between the two surfaces of the endless belts being maintained constant, the polymerized material is continuously separated from the two belts. The cast plate so prepared has surface layers of abrasion resistance, firmly adhered to the polymer body.

Instead of spreading the polymerizable material onto both surfaces of the pair of the endless belts, it is also possible to spread the material onto one surface of one of the two belts thereby producing a cast plate having only one surface layer of abrasion resistance.

A monomeric material for the polymer body is fed from a reservoir 13 through a metering pump (not shown in FIG. 2) into the casting space between the belt surfaces onto which the polymerized materials have closely adhered, and at the same time, gaskets 14 are fed between both edges of the belts 9, 9' to seal the edges of the belts. The first half part 15 of the polymerization zone is heated by spraying hot water onto the outside and the second half part thereof is heated by far infrared heaters 16 and hot air heaters. At the end of the belts, the cast plate having a surface layer of improved abrasion resistance is continuously peeled off from both belts.

The step of forming the polymer layer of abrasion resistance is usually carried out on a horizontal part of the endless belt. However, this step may be carried out on the part where the endless belt moves slopewise, depending upon the viscosity and the thickness of the material to be spread thereon. As the abrasion-resistant polymer layer so formed has a high cross-linking density and is brittle, the layer sometimes peels off from the belt or forms cracks therein due to deformation and bending of the belt. Therefore, care should be taken regarding the curvature of pulleys and rollers supporting the belt or change of the temperature thereof.

A preferable endless belt is made of metal such as steel and stainless steel and having a thickness of 0.1 to 3 mm, particularly 0.5 to 2 mm. An endless belt made of mirror polished stainless steel is most preferable because it produces a cast plate having an attractive appearance. A liquid monomeric material for the polymer body may be directly poured through a feed duct inserted at the entrance of the casting space or through a dropping funnel onto the endless belt.

In general, a gasket used in this process is made of plastic and in the form of a rod or tube. A gasket having a square or rectangular cross section may also be used, particularly in the case where a monomeric material for the polymer body having a low viscosity is used, to ensure a perfect seal between the gasket and the belts. A hollow tubular gasket may also be used in the case where a monomer-polymer mixture for the polymer body having a high viscosity is used.

The polymerization may be carried out by the outer heating and/or cooling of the polymerization zone. The polymerization temperature may be maintained constant all over the polymerization zone or varied step by step or in a continuous manner. The polymerization temperature varies depending upon the particular polymerization initiator, but it should preferably be maintained below the boiling point of the monomer until the greater part of polymerization is completed. After the completion of the greater part of polymerization, it is advantageous to raise the temperature considerably, but not to the temperature at which degradation of the polymer occurs, to complete the polymerization. The heating of the polymerization zone may be carried out, for example, by blowing hot air against the outside, by spraying hot water on the outside, by making the belts travel through a hot water bath or by using an infrared heater.

In order to keep the surfaces of the endless belt smooth and horizontal and control the thickness of the resulting cast plate at the polymerization zone, a plurality of idle rollers may be provided to support the belt or the belt may be made to slide on a smooth solid surface.

Figure 3:
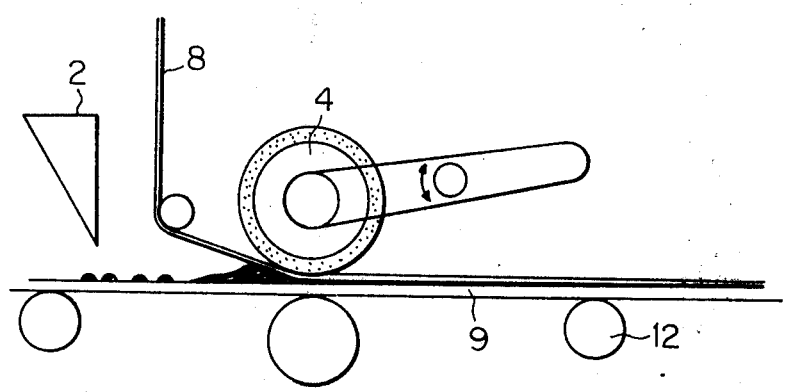
FIG. 3 shows the method whereby the abrasion-resistant surface layer forming material is coated on the upper surface of the endless belt.

FIG. 3 is an enlarged cross-sectional view showing the step where the endless polymer film 8 is closely adhered to the abrasion-resistant polymer layer forming liquid material by a press roller 4, as set forth above in reference to FIG. 2.

Figure 4:
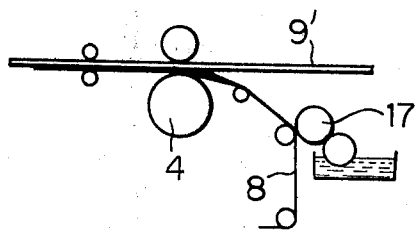
FIG. 4 shows the method whereby said material is coated on the lower surface of the endless belt.

The abrasion-resistant polymer layer forming liquid material may be applied onto the lower surface of the lower endless belt 9' as shown in FIG. 4. The liquid material is transferred via an applicator roll 17 to the surface of the polymer film 8 and then pressed against the lower surface of the endless belt 9' thereby to be closely adhered thereto. If this application system is employed in the continuous production procedure illustrated in reference to FIG. 2, the length of the lower endless belt 9' can be shortened, i.e. the belt does not need to be backwardly extended in a manner shown in FIG. 2.

The preferable process for carrying out the two step polymerization, illustrated in reference to FIG. 1, is summarized as follows. The polymerizable material is supplied to each upper surface of a plurality of mold members disposed in a line at stated intervals and continuously or intermittently moved in the direction of the line; and the polymerizable material supplied to said mold member passes through a first polymerization zone while the polymerizable material is covered with a closely adhering polymer film having little or no affinity therewith and, after the separation of the polymer film, further passes through a second polymerization zone.

The preferable process for carrying out the two step polymerization, illustrated in reference to FIG. 2, is summarized as follows. The polymerizable material is supplied to the surface of either one or both of two horizontal upper and lower endless belts, upstream to the casting space defined between the two opposed, horizontal upper and lower belt spans having side seals and continuously travelling at the same speed and in the same direction; and the polymerizable material supplied to said belt surface continuously passes through a first polymerization zone while the polymerizable material is covered with a closely adhering polymer film having little or no affinity therewith, and then, after the separation of the polymer film, further passes through a second polymerization zone, followed by continuously charging the mixture predominantly comprised of the monomer for the polymer body into said casting space.

In the above two preferable procedures, the abrasion-resistant polymer surface layer forming material having a polymerization initiator incorporated therein is supplied to the surface of the mold member or endless belts in the required or excessive amount by, for example, a dropping method, or a roll-coater or an applicator. A polymer film is closely adhered to the supplied polymerizable material by a press roller made of soft rubber or sponge rubber. A dam of the polymerizable material should be always formed immediately upstream of the pressing point in order to force out the air bubbles completely. When the polymer film has a thickness of approximately less than 30 microns, it is liable to be creased with small wrinkles. With a thickness of approximately 50 microns, the film is liable to be creased with large wrinkles. Therefore, the film of such thickness should preferably be stretched in both the longitudinal and lateral direction by a procedure set forth in reference to FIG. 1. With a thickness of more than 100 microns, the film is not liable to be creased with wrinkles.

The thickness and the material of the polymer film is determined in consideration of the mechanical strength and the tear strength in view of the fact that the film is stretched, and permeability to oxygen, absorption of ultraviolet rays, thermal resistance and deterioration due to heat and light in view of the fact that it is irradiated with ultraviolet rays or heated during polymerization.

The thickness of the polymerizable material, to which the polymer film is closely adhered, may be controlled by the coating rate, i.e. the travelling speed of the mold member and the polymer film, viscosity of the polymerizable material and pressure of the press roller. The thickness of the polymerized product depends mainly upon the thickness of the polymerizable material. The former is less than the latter, although only to a minor degree.

A suitable coating rate of the polymerizable material is generally less than 10 m/min, preferably from 1 to 6 m/min, from standpoints of, first by, complete agreement of the speed of polymer film with the travelling speed of a mold member; secondly, complete prevention of the air penetration into the polymerizable material and thirdly, time period for polymerization.

The viscosity of the polymerizable material is determined depending upon the composition and temperature, and in general is within the range of 3 to 3000 centipoise, preferably 5 to 300 centipoise.

Polymerization of the polymerizable material may be effected, for example, by circulation of a heating medium or by a heating roller. Heat may be applied directly to the coated surface or to the reverse side of the mold member. Polymerization may also be effected by irradiation with ultraviolet rays. For example, a mercury lamp, an arc lamp and a xenon lamp may be used for the irradiation. The irradiation with ultraviolet rays is advantageous in view of the polymerization rate, simplicity of the production apparatus and transparency of the polymerized material and of commercially available polymer films. This is particularly advantageous for the procedure wherein endless metal belts are employed as a mold because of good reflection.

The method wherein endless belts are employed as a mold as illustrated in reference to FIG. 2 is more advantageous than the method illustrated in reference to FIG. 1 for the following reasons. First, an endless polymer film can be employed without difficulty. In the method of FIG. 1, the polymer film is liable to be stained with the polymerizable or polymerized material forced out from the mold member and dust at the portion of the film not in contact with the polymerizable material spread on the mold member. This film cannot be reused without cleaning. Secondly, loss of the polymerizable material is slight, because the material forced out from both sides of the belt can be recovered.

The invention will be further illustrated but is not intended to be limited by the following examples in which parts and percentages are by weight unless otherwise specified.

EXAMPLE 1

100 parts of trimethylolethane triacrylate were mixed with 1 part of benzoin ethyl ether and placed and extended on one surface of a tempered glass plate with an area of approximately 1,420 mm × 1,170 mm and a thickness of 10 mm. The coated layer was covered with a polypropylene film of 0.02 mm thickness while the film was stretched in both the longitudinal and lateral directions. The polypropylene film was pressed with a roller so that no air bubbles were left between the film and the glass plate, and the thickness of the coated layer was made approximately 0.02 mm. The coated layer was subjected to first polymerization under the conditions shown in Table I, below.

Table I

| Run No. | Time for ultraviolet radiation (sec) | Gel content (%) | First polymerization conditions | Separation*[3] of polymer layer | |
|---|---|---|---|---|---|
| 1 | 30 | 79 | Ten 108 watt chemical lamps*[1] each with 1,500 mm length, disposed at approximately 130 mm intervals; | 0 | — |
| 2 | 120 | 86.5 | | 90 | 1/10 |
| 3 | 240 | 91 | Radiation distance 150 mm Three 4 Kwatt high pressure mercury arc lamps*[2] each with 1,480 mm disposed at 400 mm intervals; Radiation distance 200 mm | 80 | 1/10~ 1/3 |
| 4 | 30 | 98 | | 90 | completely separated |

Note:
*[1]FLR120EH.BA-37/AC, made by Matsushita Electric Co.
*[2]H4000L/3, made by Tokyo Shibaura Electric Co.
*[3]Left column indicates the approximate number of inferior polymer portions partially separated from the glass plate when the polymer film was peeled off from the polymer layer (total number of specimen;100), and right column indicates the proportion of the separated area to the total area of the inferior polymer portions.

The coated layer, after peeling off of the polypropylene film, was irradiated by the high pressure mercury lamp for 30 seconds whereby the coated layer was hardened to a gel content of 99 to 100%.

Two sheets of the glass plate thus prepared were made to stand so that the two polytrimethylolethane triacrylate layers were face to face with each other, and the space between the two glass plates was sealed with a nonrigid polyvinyl chloride gasket at the circumference of the glass plates, and filled with a partially polymerized methyl methacrylate syrup containing 0.05% of azobisisobutyronitrile (referred to hereinafter as AIBN for brevity). The interval between the two glass plates was adjusted to 3 mm. Thereafter, the polymerization cell was heated at a temperature of 60°C for 6 hours and further at a temperature of 120°C for 2 hours to complete polymerization. After cooling the cell, the resultant methyl methacrylate resin cast plate was released from the glass plates.

The polytrimethylolethane triacrylate layers obtained from the coated layer of Run No. 1 shown in Table I came off from the glass plate, i.e. they had been firmly adhered to the methyl methacrylate resin cast plate. The methyl methacrylate resin cast plate had attractive surfaces free from unevenness and optical distortion.

In contrast, the methyl methacrylate resin cast plates obtained by using the polymer layers of Run Nos. 2 and 3 shown in Table I had a surface, at a part of which the hardened polytrimethylolethane triacrylate layer is not present. It was difficult to separate the cast plates from the glass plates after the casting.

When the polymer layer of Run No. 1 is further polymerized with irradiation by a high pressure mercury lamp to gel content of lower than 90%, the resultant cast article exhibited far reduced abrasion resistance and had uneven and optically distorted surfaces.

EXAMPLE 2

The procedure of Example 1 was repeated except that a mixture of 60 parts of 1,6-hexanediol diacrylate, 40 parts of pentaerythritol tetraacrylate, 1.5 parts of benzoin isopropyl ether and 0.01 part of Tinuvin-P (trade name for "2-(2'-hydroxy-5'-methylphenyl)-benzotriazole" supplied by Ciba-Geigy, Ultraviolet Absorber) was used as the polymer layer forming material and a polyester film of 0.012 mm thickness was used as a covering member. The thickness of the polymer layer was approximately 0.015 mm. The results thus obtained are shown in Table 2.

Table 2

| Run No. | Time for ultraviolet radiation (sec) | Gel content upon completion of first polymerization (%) | Separation of polymer layer (100 specimens) | |
|---|---|---|---|---|
| 1 | 30 | 86 | 0 | — |
| 2 | 60 | 90.5 | 20 | 1/10 |
| 3 | 120 | 93 | 40 | 1/10 – 1/5 |
| 4 | 240 | 94.5 | 80 | more than 1/3 |

The polymer layer of Run No. 1 was irradiated by high pressure mercury lamp for 24 seconds in the absence of the covering member whereby the polymer layer was further polymerized to a gel content of 96%. By using the two glass sheets thus prepared a cast plate having attractive surfaces free from unevenness and optical distortion was obtained.

EXAMPLES 3–6

The procedure of Run No. 1 in Example 1 was repeated except that the conditions listed in Table 3 were used.

Good cast plates were obtained, and no separation between the glass plate and the polymer layer was found when the polymer film was peeled off from the glass plate.

When the gel content upon completion of the first polymerization exceeds approximately 90%, the polymer layer tends to become separated from the glass plate when the polymer film was peeled off from the glass plate. This tendency becomes remarkable when the gel content exceeds approximately 95%.

Table 3

| Ex. No. | Composition of polymer layer forming material | (part) | Thickness of polymer layer (mm) | Thickness of polymer film (mm) | Time period for first polymerization (sec) | Gel content upon completion of first polymerization (%) | Time period for second polymerization (sec) |
|---|---|---|---|---|---|---|---|
| 3 | Tetraethylene glycol dimethacrylate | 70 | 0.012 | 0.025 (polyester) | 20 | 80 | 36 |
|   | Bis(ethylene glycol) phthalate dimethacrylate | 30 | | | | | |
|   | Benzoin butyl ether | 3.0 | | | | | |
| 4 | 1,4-butanediol diacrylate | 100 | 0.007 | 0.012 (polyester) | 30 | 81 | 36 |
|   | Benzoin ethyl ether | 1.5 | | | | | |
| 5 | Trimethylolpropane triacrylate | 95 | 0.03 | 0.03 (polyvinyl chloride) | 20 | 77 | 24 |
|   | Methacrylic acid | 5 | | | | | |
|   | Benzoin isobutyl ether | 1.0 | | | | | |
| 6 | Pentaerythritol tetraacrylate | 70 | 0.02 | 0.03 (vinylon) | 20 | 76 | 36 |
|   | Methyl acrylate | 30 | | | | | |
|   | Benzoin ethyl ether | 1.0 | | | | | |

EXAMPLE 7

An apparatus shown in FIG. 2 was used. Two mirror-polished stainless steel endless belts 9, 9' each having a thickness of 1 mm and a width of 1,200 mm were continuously moved, while being stretched by the main pulleys 10, 11 and 10', 11' each having a diameter of 1,500 mm respectively, at a speed of 0.5 m/min by driving the main pulley 11'. The lower belt 9' was 10 m longer than the upper belt 9. The initial tension, 10 kg per mm$^2$ of cross-sectional area of the belt, was applied by oil pressure cylinders provided in the main pulleys 10 and 10'.

In the polymerization zones, 5, 6 and 5', 6', the same chemical lamp and high pressure mercury lamp as employed in Example 1 were disposed at right angles to the traveling direction of belt under the following conditions. That is, in each of the first polymerization zones 5 and 5', two chemical lamps were disposed at 100 mm interval and 100 mm of radiation distance, and in each of the second polymerization zones 6 and 6' two high pressure mercury lamps were disposed at 400 mm interval and 150 mm of radiation distance.

The same polymer layer-forming material as that in Example 1 was continuously fed through metering pumps and spread onto surfaces of the two endless belts 9 and 9', respectively in a manner such that a polymer layer of 0.02 mm thickness was formed on each surface of the belts 9 and 9'. Endless polypropylene films 8 and 8', each of 0.02 mm thickness, while being stretched by clip tenters and moved at the same speed as those of the endless belts, were closely adhered to the spread surfaces at the same speed as those of the endless belts by press rollers 4, 4' in a manner such that air bubbles were forced out from the material. Then, each of the spread materials passed through the first and second polymerization zones while being closely adhered to the polypropylene film, and completely polymerized or hardened thereby. Thus, the polymerized materials were closely adhered to the surfaces of the belts 9 and 9'. The belts 9 and 9' were suitably supported by a plurality of idle rollers 12 and 12' arranged extending throughout the zones where surface layers of the polymerized material were formed.

Then, a monomer mixture containing 80 parts of methyl methacrylate, 20 parts of polymethyl methacrylate having a polymerization degree of approximately 900 and 0.02 part of azobisdimethylvaleronitrile was continuously fed from a metering pump through an injection device into the space between the belt surfaces onto which the polymerized materials were adhered. At the same time, hollow tubular gaskets 14 made of polyvinyl chloride resin containing an appropriate amount of plasticizer were fed between both edges of the belts 9, 9'. The polymerization zone was extended over 60 m, at the first 40 m part of which a plurality of idle rollers 12, 12' were arranged at 300 mm intervals to control precisely the distance between the belt surfaces facing each other and heating was performed by spraying water of 70°C from a nozzle onto the outside of the belts, and the second 20 m part of which a plurality of idle rollers 12, 12' were arranged at 2 m intervals to support the belts and the belts were heated at a temperature of approximately 120°C using an infrared heater and a hot air oven. After being cooled, a cast plate of 3 mm thickness was continuously peeled off from the belts, which had no optical distortion and had a smooth surface layer of excellent abrasion resistance closely adhered to the polymer body.

No separation between the polymer layer and the endless belt was found when the endless film was peeled off from the polymerized layer.

EXAMPLE 8

The procedure of Example 3 was repeated except that a mixture of 50 parts of 1,6-hexanediol diacrylate, 50 parts of trimethylolethane triacrylate and 1.5 parts of benzoin ethyl ether was used as an abrasion-resistant polymer surface layer-forming material and polyester films of 0.1 mm and 0.2 mm thickness were used as polymer films.

The resultant cast plate having a polymer layer of 0.01 mm thickness exhibited good properties. Similar good results were obtained even in the case where the polyester films were not stretched by clip tenters.

EXAMPLE 9

The procedure of Example 7 was repeated except that a mixture of 30 parts of trimethylolpropane triacrylate, 70 parts of 1,6-hexanediol diacrylate and 4 parts of benzoin ethyl ether was used as a polymer surface layer-forming material, polyester film of 0.012 mm thickness was used for the polymer films and the following conditions were used.

| | |
|---|---|
| Endless belts speed | 1.5 m/min |
| Polymerization initiator | 0.07 part of azobisdimethyl-valeronitrile |
| Polymerization temperature | 80°C |

The cast plate having a polymer layer of 0.015 mm thus manufactured exhibited good properties.

EXAMPLE 10

An apparatus shown in FIG. 1 was used. Tempered glass plates each having an area of approximately 1420 mm × 1170 mm and a thickness of 10 mm were used as mold members and continuously moved at a speed of 2.0 m/min by a conveyor with distance between the adjacent mold members of approximately 150 mm.

A mixture of 100 parts of trimethylolethane triacrylate and 1 part of benzoin ethyl ether was continuously flowed through a metering pump and spread onto the mold member A as a polymer layer-forming material. A polyester film 8 having a thickness of 0.012 mm and a width of 1600 mm, while being stretched by a clip tenter and moved at the same speed as that of the mold member, was closely adhered to the spread surface by a press roller 4 in a manner such that the spread material had a uniform thickness of approximately 0.02 mm and air bubbles were forced out from the spread material. Then, the spread material passed through the first and second polymerization zones where the same chemical lamps and high pressure mercury lamps as employed in Example 1 were disposed at right angles to the mold member moving direction under the following conditions. That is, ten chemical lamps were disposed at approximately 130 mm intervals and 150 mm of radiation distance in the first polymerization zone, and three high pressure mercury lamps were disposed at approximately 400 mm intervals and 200 mm of radiation distance in the second polymerization zone.

No separation between the polymerized layer and the mold member B was found when the polyester film was peeled off from the mold member B.

Thus, the spread material passed through the first and the second polymerization zone and completely polymerized thereby.

Two mold members C each having a polymer layer of approximately 0.02 mm thickness thus obtained were placed so that the two polymer layers were face to face with each other, and the space between the two mold members was sealed with a non-rigid polyvinyl chloride gasket at the circumference of the glass plates, and filled with a partially polymerized product of methyl methacrylate which product contained 0.05% of AIBN. The distance between the two mold members was adjusted to 3 mm. Thereafter, the mold was heated at a temperature of 60°C for 6 hours and at a temperature of 120°C for a further 2 hours to perform polymerization. After cooling the mold, the resultant methyl methacrylate resin cast plate was released from the glass plates. The thin polymer layers firmly adhered to the polymer body. The cast plate had attractive surfaces free from unevenness and optical distortion.

EXAMPLE 11

The procedure of Example 10 was repeated except that a mixture of 30 parts of trimethylolethane triacrylate, 70 parts of 1,6-hexanediol diacrylate and 1 part of benzoin ethyl ether was used as a polymer layer-forming material mold members were moved at a speed of 1 m/min and a thickness of a polymer layer was approximately 0.01 mm. Good results similar to those of Example 10 were obtained.

EXAMPLE 12

The procedure of Example 11 was repeated except that 2.5 parts of benzoin ethyl ether was used and mold members were moved at a speed of 3 m/min. Good results similar to those of Example 11 were obtained.

The thickness of the polymer layer was approximately 0.013 mm.

EXAMPLE 13

The polymer layer forming material used in Example 1 was subjected to first polymerization under the same conditions as those of Run No. 1 in Table 1, and then irradiated by high pressure mercury lamp for 30 seconds in the absence of polymer film whereby the polymer layer was further polymerized to a gel content of 99%.

Two glass plates so prepared were placed so that the two polymer layers were face to face with each other, and the space between the two glass sheets was filled with a partially polymerized product of 90% by weight of methyl methacrylate and 10% by weight of methyl acrylate, which product contained 0.05% by weight of AIBN. After sealing the circumference of the glass plates with a plasticized polyvinyl chloride gasket, the distance between the two glass plates was adjusted to 3 mm. Thereafter, the mold was heated at a temperature of 60°C for 6 hours and at a temperature of 120°C for a further 2 hours to perform polymerization.

The cast plate thus obtained exhibited good results similar to those of Run No. 1 of Example 1.

EXAMPLE 14

The procedure of Example 13 was repeated except that a mixture of 60 parts of methylmethacrylate, 15 parts of methacrylic acid, 3 parts of Phosgard C-22-R (trade name for "chlorinated polyphosphonate" by Monsanto Chemical) and 0.05 part of AIBN was used and the mold was heated at a temperature of 55°C for 20 hours and then at a temperature of 100°C for further 2 hours to perform polymerization.

Good results similar to those of Example 13 were obtained.

What we claim is:

1. An improvement in a process for producing a synthetic resin cast article having an abrasion-resistant polymer surface layer integrated with the polymer body, which process includes the steps of:
    a. spreading onto all or part of the inner surface of a mold member a liquid polymerizable material selected from (i) a compound having a total of at least two acryloxy ($CH_2$=CH.CO.O—) and/or methacryloxy ($CH_2$=C($CH_3$).CO.O—) groups in the molecule, and having a molecular weight of at least 150, (ii) a mixture comprising at least 30% by weight of said compound and at most 70% by weight of at least one other copolymerizable monoethylenically unsaturated compound, and (iii) a partially polymerized product of said compound or said mixture,
    b. polymerizing the polymerizable material to an extent such that the polymerized material is not swollen with or dissolved in a monomer to be formed into the polymer body, thereby forming an abrasion-resistant polymer layer on the inner surface of the mold member,
    c. charging a mixture of the monomer for the polymer body and a polymerization initiator into the mold and then, polymerizing the monomer, and
    d. after completion of polymerization, releasing the cast article from the mold, wherein the improvement comprises carrying out the polymerization step (b) of said polymerizable material in two steps; in the first step the polymerizable material is polymerized, while covered with a closely adhering covering body having little or no affinity therewith, to a gel content that is within the range of 40% to 95% and at which the covering body is easily separated from the polymerizable material without simultaneous separation of the polymerizable material from the inner surface of said mold member, and in the succeeding second step polymerization is continued in the absence of the covering body with exposure to air until the gel content increases by 0.5% to 60% and reaches at least 90% and to an extent such that the polymerized material is not swollen with or dissolved in the monomer to be formed into the polymer body, the polymerization in the second step being completed prior to step (c), and wherein said first and second steps are carried out in the presence of a photosensitizer capable of activating the polymerizable material with light of a predominant wave length of from 3,000 to 4,000 A.

2. An improvement according to claim 1 wherein said first step polymerization is carried out until the gel content reaches 60% to 90% and the succeeding second step polymerization is carried out until the gel content reaches at least 95%.

3. An improvement according to claim 1 wherein said covering body is a film or sheet of an organic high polymer.

4. An improvement according to claim 3 wherein said organic high polymer is polyester.

5. An improvement according to claim 3 wherein said organic high polymer is selected from polypropylene, polyethylene, polyvinyl alcohol and its acetalized product, polyvinyl chloride and cellulose.

6. An improvement according to claim 1 wherein the polymerized material has 0.001 to 0.5 mm thickness.

7. An improvement according to claim 1 wherein the polymerized material has a thickness of 0.003 to 0.1 mm.

8. An improvement according to claim 1 wherein the acryloxy and/or methacryloxy groups contained in said compound are linked with an aliphatic hydrocarbon having no more than 20 carbon atoms or an aliphatic hydrocarbon having at least one ether linkage in the main chain and having no more than 20 carbon atoms.

9. An improvement according to claim 1 wherein said compound has a total of at least two acryloxy groups linked with an aliphatic hydrocarbon having no more than 20 carbon atoms or an aliphatic hydrocarbon having at least one ether linkage in the main chain and having no more that 20 carbon atoms.

10. An improvement according to claim 9 wherein said compound is at least one selected from the group consisting of pentaorythritol tetraacrylate, trimethylolalkane triacrylate and alkanediol diacrylate.

11. An improvement according to claim 1 wherein said monomer for the polymer body is methyl methacrylate or a monomeric mixture containing at least 50% by weight of methyl methacrylate.

12. An improvement according to claim 1 wherein said two step polymerization is carried by supplying the polymerizable material to each upper surface of a plurality of mold members disposed in a line at stated intervals and continuously or intermittently moved in the direction of the line; the polymerizable material supplied to said mold member passing through a first polymerization zone while the polymerizable material is covered with a closely adhering polymer film having little or no affinity therewith and, after the separation of the polymer film, further passing through a second polymerization zone.

13. An improvement according to claim 12 wherein said first step polymerization and the succeeding second step polymerization are carried out until the gel content reaches 60% to 90% and at least 95%, respectively.

14. An improvement according to claim 12 wherein said polymer film is pressed against the polymerizable material by a press roller having a soft surface, upstream to the first polymerization zone.

15. An improvement according to claim 1 wherein said two step polymerization of the polymerizable material is carried out by supplying the polymerizable material to the surface of either one or both of two horizontal upper and lower endless belts, upstream to the casting space defined between the two opposed, horizontal upper and lower belt spans having side seals and continuously travelling at the same speed and in the same direction; the polymerizable material supplied to said belt surface continuously passing through a first polymerization zone while the polymerizable material is covered with closely adhering polymer film having little or no affinity therewith, and then, after the separation of the polymer film, further passing through a second polymerization zone, followed by continuously charging the mixture predominantly comprised of the monomer for the polymer body into said casting space.

16. An improvement according to claim 15 wherein said first step polymerization and the succeeding second step polymerization are carried out until the gel content reaches 60% to 90% and at least 95%, respectively.

17. An improvement according to claim 15 wherein said polymer film is pressed against the polymerizable material by a press roller having a soft surface, upstream to the first polymerization zone.

18. An improvement according to claim 15 wherein said polymer film is in the endless form.

* * * * *